3,442,837
TRANSPARENT POLYVINYL CHLORIDE CONTAINING HIGH DENSITY POLYETHYLENE AS A LUBRICANT
Walter Brotz, Gersthofen, and Dietrich Runge, Aystetten, Germany, and Manfred Karl Furchtegott Albrecht, deceased, late of Gersthofen, Germany, by Helene Albrecht, nee Ruess, coheiress, Gersthofen, Hilde Albrecht, Gauting, and Elisabeth Hertlein, nee Paulus, Munich, Germany, legal representatives, assignors to Farbwerke Hoechst Aktiengesellschaft vormals Meister Lucius & Bruning, Frankfurt am Main, Germany, a corporation of Germany
No Drawing. Filed Dec. 1, 1965, Ser. No. 510,987
Claims priority, application Germany, Dec. 2, 1964, F 44,586
Int. Cl. C08f 29/18
U.S. Cl. 260—23           3 Claims

ABSTRACT OF THE DISCLOSURE

Polyvinyl chloride containing, as a lubricant, 0.1 to 10% by weight of a low pressure polyethylene having a density of 0.93 to 0.97 and a molecular weight of 3,000 to 20,000 and, optionally, esters of montan acids, fatty acids having 8 to 18 carbon atoms, esters of said fatty acids or salts of said fatty acids.

---

The present invention relates to a lubricant for transparent polyvinyl chloride.

When rigid polyvinyl chloride is processed on the calender, in the extruder or in an injection molding machine lubricants must be used for improving the flow and the thermostability, for avoiding tackiness and for the formation of smooth and glossy surfaces. Besides the known auxiliaries such as fatty acids and their salts, fatty acid esters, paraffins and waxes, there have been proposed polyethylenes of low density and low molecular weight, because products of this type have a particularly high lubricating effect. They exhibit the disadvantage, however, that they render polyvinyl chloride strongly turbid. The opacity caused by polyethylenes of this type slightly diminishes with increasing molecular weight, but as low as possible a molecular weight is desired because the lubricating effect is in inverse proportion to the molecular weight.

It has now been found that transparent polyvinyl chloride can advantageously be processed when as lubricant 0.1 to 10% by weight, calculated on the total mixture, of a low pressure polyethylene are added having a density of 0.93 to 0.97 and a molecular weight of 3,000 to 20,000.

Suspension polyvinyl chloride having a K value of 50 to 90, which is free from plasticizer and difficult to work up can thus be shaped into transparent articles such as sheets, tubes, fittings and profiles. The polyethylene to be used has a density of from 0.93 to 0.97 and preferably 0.94 to 0.96 at 20° C. and a molecular weight ranging from 3,000 to 20,000, preferably from 6,000 to 12,000.

Known and also highly effective processing auxiliaries, such as esters of montan acids, which render polyvinyl chloride turbid can be considerably improved as regards their opacity, without their lubricating effect being reduced, by adding 20 to 90% of polyethylene, calculated on the esters of montan acids.

By esters of montan acids there are to be understood esters of fatty acids having an acid number of 100 to 160, obtained by oxidative bleaching of resinous or deresinified crude montan wax, for example with chromosulfuric acid, and esterified with 0.4 to 1 equivalent of polyhydric alcohols, for example ethylene glycol and butylene glycol, or mixtures thereof.

Moreover, lubricants which do not render turbid polyvinyl chloride but have a low lubricating effect, for example low molecular weight monocarboxylic acids having 8 to 18 carbon atoms, the esters thereof with monohydric and polyhydric aliphatic alcohols having 2 to 24 carbon atoms in the alcohol component, and salts thereof with metals of the second and third group of the Periodic Table, such as stearic acid, calcium stearate, cadmium laurate, barium laurate, aluminum stearate, lead palmitate, stearyl stearate, stearyl propionate and isopropionate, stearyl laurate, stearyl octoate, glycerol stearate and glycerol palmitate, can be decisively improved in their lubricating effect without the turbidity of polyvinyl chloride being increased, by the addition of polyethylene and used in the same manner as the aforesaid esters of montan acids.

It is therefore advantageous to use as lubricant 0.1 to 10% by weight, calculated on the total mixture of polyvinyl chloride and lubricant, of a mixture consisting of 20 to 90% by weight of the specified polyethylene and 80 to 10% by weight of esters of montan acids or of the fatty acids having 8 to 18 carbon atoms or the esters or salts thereof.

The following example serves to illustrate the invention but it is not intended to limit it thereto.

Example

Different amounts of polyethylenes having the required density and molecular weight and a density outside the claimed range, respectively, were added to polyvinyl chloride, free from plasticizer and having a K value of 70. The values obtained are indicated in the following table.

|  | Density | Molecular weight | Lubricating effect [1] | Opacity [2] with addition of— | | |
|---|---|---|---|---|---|---|
|  |  |  |  | 0.5% | 1% | 3% |
| (A) Polyethylene | 0.95 | 3,000 | 60 | 93 | 92 | 87 |
|  | 0.95 | 9,000 | 60 | 94 | 93 | 91 |
| (B) Polyethylene of lower density | 0.92 | 2,000 | 60 | 92 | 83 | 77 |
|  | 0.91 | 6,000 | 59 | 92 | 85 | 83 |
| Comparative test | 0.92 | 20,000 | 50 | 92 | 90 | 83 |

[1] Lubricating effect: Running time in minutes of a mixture of 1,000 parts of suspension polyvinyl chloride having a K value of 70, 1 part of stabilizer and 0.5 part of lubricant on a two roll mill at 180° C. until decomposition occurs.
[2] Opacity: Luminous transmittance in % of a 0.5 mm. thick polyvinyl chloride sheet in comparison with the unfiltered ray (100%).

What is claimed is:

1. Composition of matter consisting essentially of 0.1 to 10% by weight, calculated on the total mixture, of a low pressure polyethylene having a density of 0.93 to 0.97 and a molecular weight of 3,000 to 20,000 and 99.9 to 90% by weight of plasticizer-free suspension polyvinyl plasticizer-free suspension polyvinyl chloride having a K value of 50 to 90.

2. Composition of matter consisting essentially of 99.9 to 90% by weight of plasticizer-free suspension polyvinyl chloride having a K value of 50 to 90 and 0.1 to 10% by weight of a mixture consisting of 20 to 90% by weight of a low pressure polyethylene having a density of 0.93 to 0.97 and a molecular weight of 3,000 to 20,000 and 80 to 10% by weight of a member selected from the group consisting of esters of montan acids with polyhydric alcohols, fatty acids having 8 to 18 carbon atoms, esters of fatty acids having 8 to 18 carbon atoms with mono- or polyhydric aliphatic alcohols having 2 to 24 carbon atoms and salts of fatty acids having 8 to 18 carbon atoms with a member selected from the group consisting of lead and metal of the second or third group of the Periodic Table.

3. Process for using low pressure polyethylene having a density of 0.93 to 0.97 and a molecular weight of 3,000 to 20,000 as lubricant for mechanically working transparent polyvinyl chloride, which comprises admixing plasticizer-free suspension polyvinyl chloride having a K value of 50 to 90 with 0.1 to 10% by weight, calculated on the total mixture, of the said low pressure polyethylene and mechanically working the resulting mixture.

References Cited

UNITED STATES PATENTS

| | | | |
|---|---|---|---|
| 2,897,176 | 7/1959 | Rocky et al. | 260—897 |
| 3,046,237 | 7/1962 | Rosenfelder et al. | 260—23 |
| 3,075,946 | 1/1963 | Zupic | 260—897 |
| 3,085,082 | 4/1963 | Baer et al. | 260—897 |
| 3,125,545 | 3/1964 | Van Cleve et al. | 260—897 |
| 3,143,431 | 8/1964 | Kaupp et al. | 106—8 |
| 3,309,426 | 3/1967 | Hunyar | 260—897 |

DONALD E. CZAJA, *Primary Examiner.*

R. A. WHITE, *Assistant Examiner.*

U.S. Cl. X.R.

260—28.5, 31.2, 897; 264—300